United States Patent
Pinarbasi

(12) 
(10) Patent No.: US 6,275,362 B1
(45) Date of Patent: Aug. 14, 2001

(54) MAGNETIC READ HEAD HAVING SPIN VALVE SENSOR WITH IMPROVED SEED LAYER FOR A FREE LAYER

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/364,913

(22) Filed: Jul. 30, 1999

(51) Int. Cl.[7] ............................................ G11B 5/39
(52) U.S. Cl. ........................................ 360/324.12
(58) Field of Search .............. 360/324.12, 317; 324/252

(56) References Cited

U.S. PATENT DOCUMENTS

| | | | |
|---|---|---|---|
| 5,260,653 | 11/1993 | Smith et al. | 324/252 |
| 5,268,806 | 12/1993 | Goubau et al. | 360/113 |
| 5,606,478 | 2/1997 | Chen et al. | 360/126 |
| 5,650,897 | 7/1997 | Cohen et al. | 360/126 |
| 5,659,451 | 8/1997 | Cohen et al. | 360/126 |
| 5,673,163 | 9/1997 | Cohen | 360/126 |
| 5,804,085 | 9/1998 | Wu et al. | 216/22 |
| 5,820,770 | 10/1998 | Cohen et al. | 216/22 |
| 5,905,610 | * 5/1999 | Mitchell et al. | 360/113 |
| 5,932,343 | * 8/1999 | Hayashi et al. | 428/332 |
| 6,052,262 | * 4/2000 | Kamiguchi et al. | 360/113 |

* cited by examiner

Primary Examiner—Jefferson Evans
(74) Attorney, Agent, or Firm—Gray Cary Ware & Freidenrich; Ervin F. Johnston

(57) ABSTRACT

A seed layer is provided between a first read gap layer and a free layer of a spin valve sensor for increasing the magnetoresistive coefficient dr/R of the sensor by improving the microstructure of the free layer. The seed layer may be a nickel iron oxide (NiFeO) material or a cobalt niobium (CoNb) based material. In other embodiments of the invention a buffer layer is located between the seed layer and the free layer for still further increasing the magnetoresistive coefficient dr/R of the sensor by further improving the microstructure of the free layer. The buffer layer may be tantalum (Ta) or copper (Cu).

41 Claims, 10 Drawing Sheets

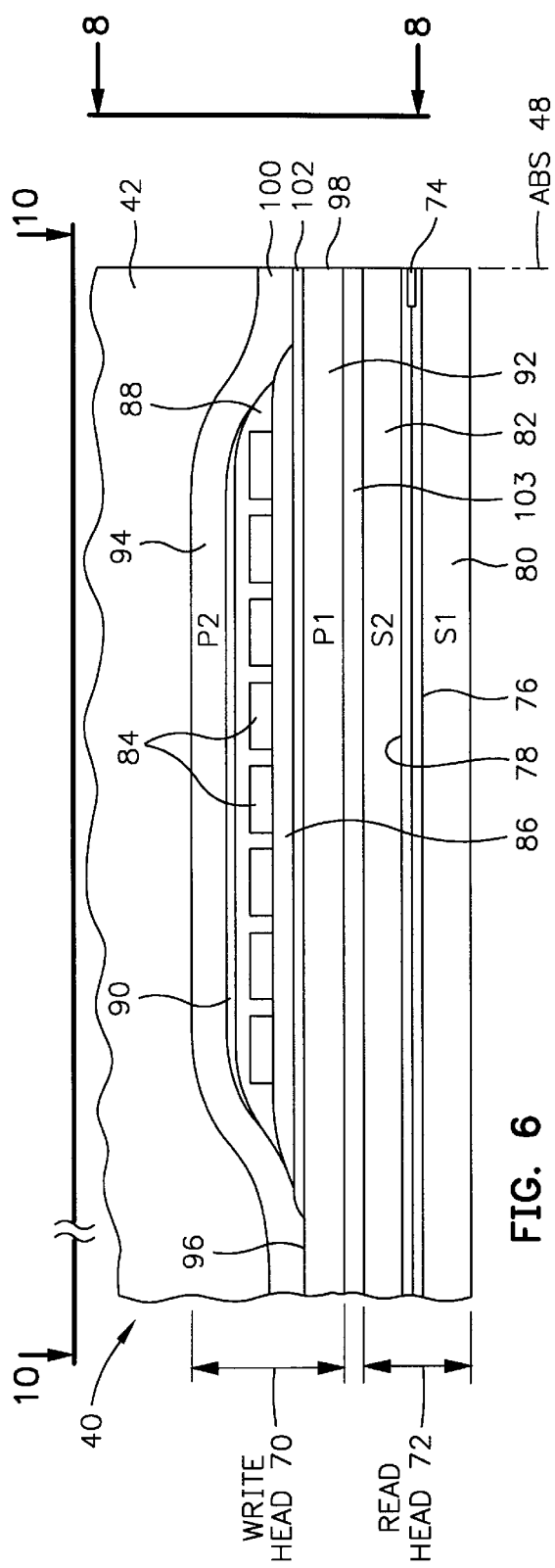
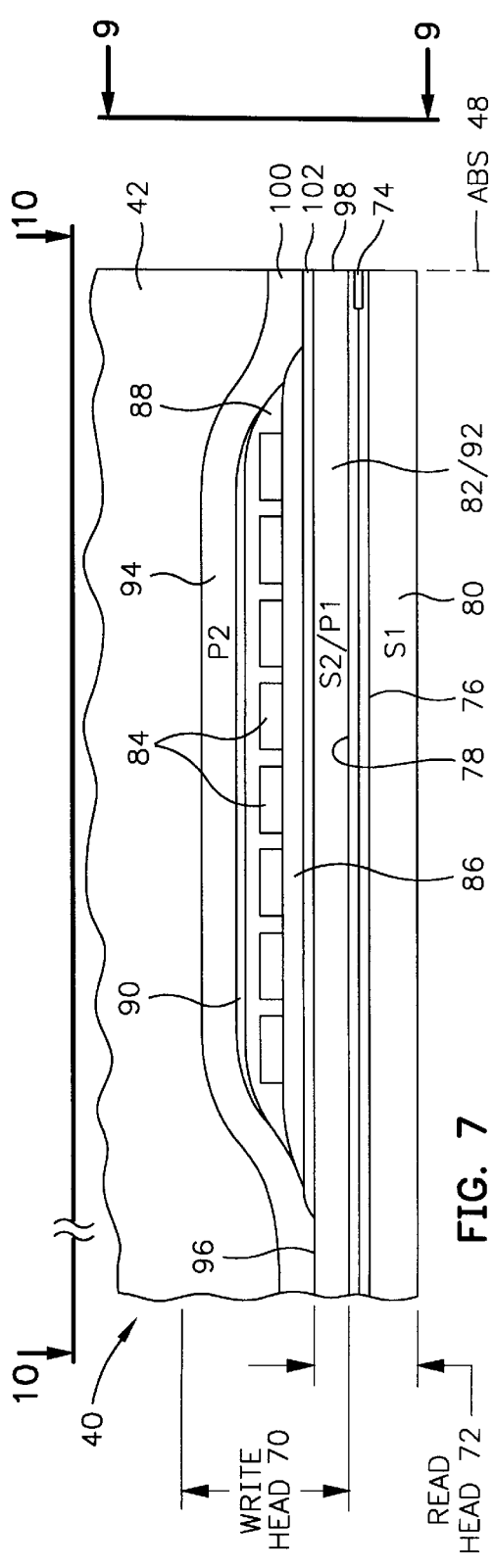

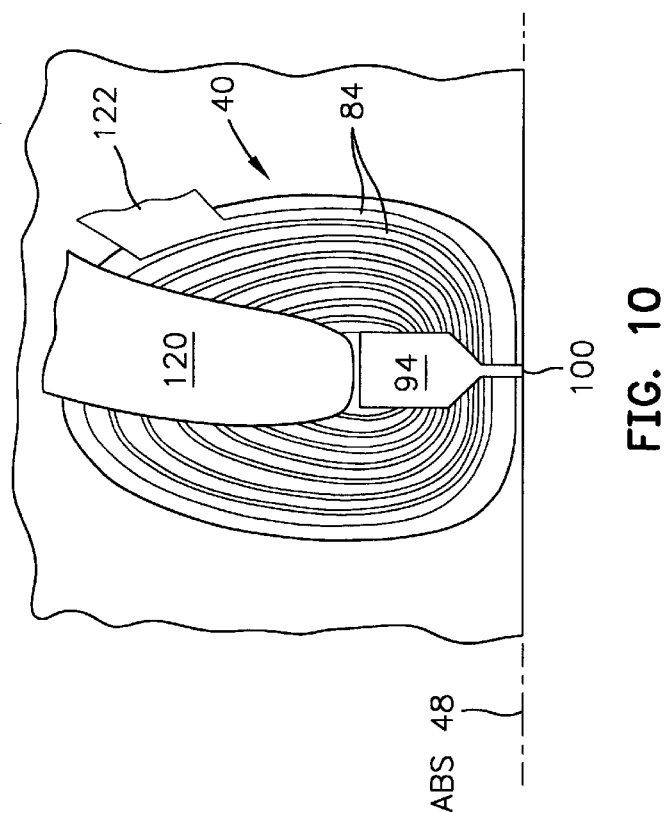
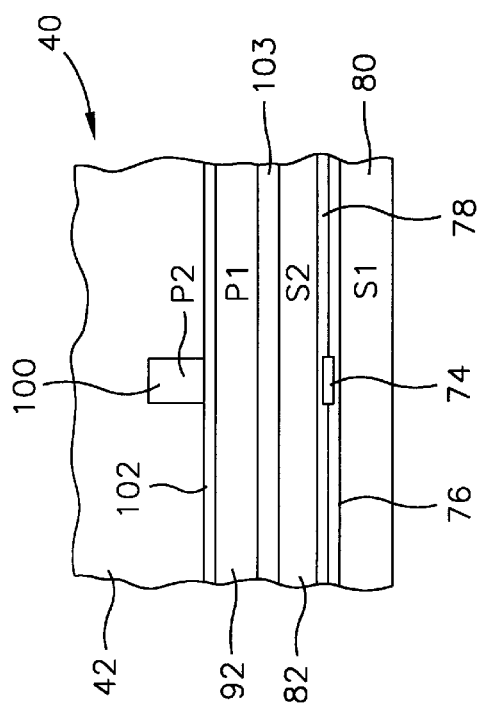
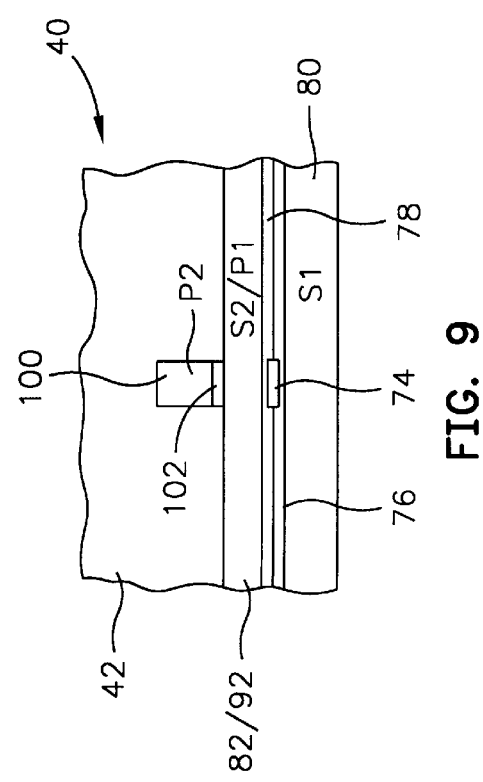
FIG. 10
FIG. 8
FIG. 9

(ABS)

MAGNETIC READ HEAD HAVING SPIN VALVE SENSOR WITH IMPROVED SEED LAYER FOR A FREE LAYER

BACKGROUND OF THE INVENTION

1. Field of the Invention

The present invention relates to a magnetic head that has a spin valve sensor with an improved seed layer for a free layer and more particularly to a seed layer that modifies the micro structure of the free layer for improving a magnetoresistive effect of the sensor.

2. Description of the Related Art

A spin valve sensor is employed by a read head for sensing magnetic fields on a moving magnetic medium, such as a rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the magnetic medium. First and second leads are connected to the spin valve sensor for conducting a sense current therethrough. A magnetic moment of the free layer is free to rotate in positive and negative directions from a quiescent or bias point position in response to positive and negative magnetic field signals from a rotating magnetic disk. The quiescent position, which is typically parallel to the ABS, is the position of the magnetic moment of the free layer with the sense current conducted through the sensor in the absence of signal fields.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons are scattered at the interfaces of the spacer layer with the pinned and free layers. When the magnetic moments of the pinned and free layers are parallel with respect to one another scattering is at a minimum and when their magnetic moments are antiparallel scattering is maximized. Changes in scattering in response to field signals from a rotating disk changes the resistance of the spin valve sensor as a function of $\cos \theta$, where $\theta$ is the angle between the magnetic moments of the pinned and free layers. The sensitivity of the sensor is quantified as magnetoresistive coefficient $dr/R$ where $dr$ is the change in resistance of the sensor between parallel and antiparallel orientations of the pinned and free layers and $R$ is the resistance of the sensor when the moments are parallel.

Over the years a significant amount of research has been conducted to improve the GMR or magnetoresistive coefficient $dr/R$ of spin valve sensors. These efforts have increased the storage capacity of computers from kilobytes to megabytes to gigabytes. A factor in improving the magnetoresistive coefficient $dr/R$ is the texture of the various layers of the spin valve sensor. Researchers strive to optimize the texture of the layers, which is sometimes more texture and sometimes less texture, for improving the layers performance. The performances of the spacer layer and the free and pinned layers on each side of the spacer layer are the most important for improving the magnetoresistive coefficient $dr/R$. This is where the scattering of conduction electrons takes place and an increase in phased scattering equates to an increase in the magnetoresistive coefficient $dr/R$.

The spin valve sensor is made by sputter depositing the layers consecutively on the first read gap layer. The first read gap layer, which is typically aluminum oxide ($Al_2O_3$), affects the texture of the first layer of the spin valve sensor deposited thereon. Sometimes this affect is not favorable or needs improvement. For this reason a seed layer is often located between the first read gap layer and the next layer of the spin valve sensor for favorably modifying the texture of the next layer.

The type of seed layer employed on the first read gap layer depends somewhat on whether the spin valve sensor is a top spin valve sensor or a bottom spin valve sensor. In a top spin valve sensor the pinning layer is located in a top portion of the spin valve sensor close to the second read gap layer and the free layer is located in a bottom portion of the spin valve sensor close to the first read gap layer. In a bottom spin valve sensor the pinning layer is located in a bottom portion of the spin valve sensor close to the first read gap layer and the free layer is located in a top portion of the sensor close to the second read gap layer. While the free layer can be deposited directly on the first read gap layer in a top spin valve sensor it has been found that a seed layer between the first read gap layer and the free layer can be employed for favorably modifying the texture of the free layer for improving the magnetoresistive coefficient $dr/R$. The search continues for seed layers which will promote the best magnetoresistive coefficient $dr/R$ so as to increase storage capacity.

SUMMARY OF THE INVENTION

The present invention provides a seed layer between the first read gap layer and the free layer in a top spin valve sensor for modifying the texture of the free layer in such a way that the magnetoresistive coefficient $dr/R$ is increased. The texture of the seed layer affects the texture of the free layer deposited thereon and the free layer affects the texture of the spacer layer deposited thereon and the texture of the spacer layer affects the texture of the pinned layer deposited thereon. Accordingly, the seed layer affects all of the layers deposited thereon. I have found that a seed layer composed of an amorphous cobalt niobium (CoNb) based material or a crystalline nickel iron oxide (NiFeO) material will modify the crystalline texture of the nickel iron (NiFe) free layer for improving the magnetoresistive coefficient $dr/R$. The cobalt niobium (CoNb) based material may be cobalt iron niobium (CoFeNb), cobalt niobium hafnium (CoNbHf) or cobalt iron niobium hafnium (CoFeNbHf). In other embodiments of the invention the magnetoresistive coefficient $dr/R$ may be further increased by locating a nonmagnetic buffer layer between the seed layer and the free layer. This buffer layer may be tantalum (Ta) or copper (Cu).

An object of the present invention is to provide a seed layer in a top spin valve sensor that increases the magnetoresistive coefficient $dr/R$ of the spin valve sensor by favorably modifying the texture of a free layer.

Another object is to provide a buffer layer between the seed layer and the free layer in the previous object that further favorably modifies the texture of the free layer for increasing the magnetoresistive coefficient $dr/R$ of the spin valve sensor.

Other objects and attendant advantages of the invention will be appreciated upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 8 is a partial ABS view of the slider taken along plane 8—8 of FIG. 6 to show the read and write elements of the piggyback magnetic head;

FIG. 9 is a partial ABS view of the slider taken along plane 9—9 of FIG. 7 to show the read and write elements of the merged magnetic head;

FIG. 10 is a view taken along plane 10—10 of FIGS. 6 or 7 with all material above the coil layer and leads removed;

DESCRIPTION OF THE PREFERRED EMBODIMENTS

Magnetic Disk Drive

Figure 1:
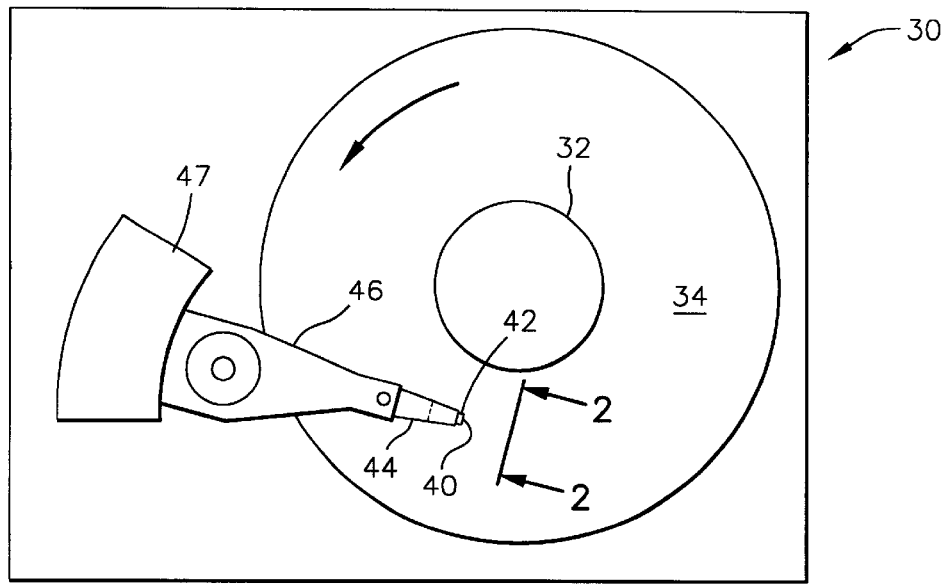
FIG. 1 is a plan view of an exemplary magnetic disk drive.
Figure 2:
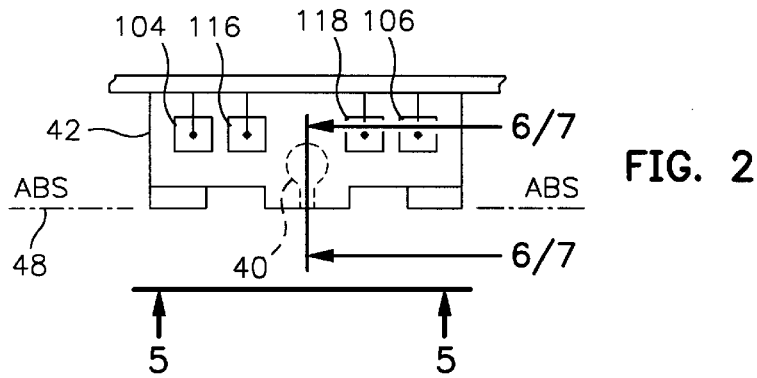
FIG. 2 is an end view of a slider with a magnetic head of the disk drive as seen in plane 2—2.
Figure 3:
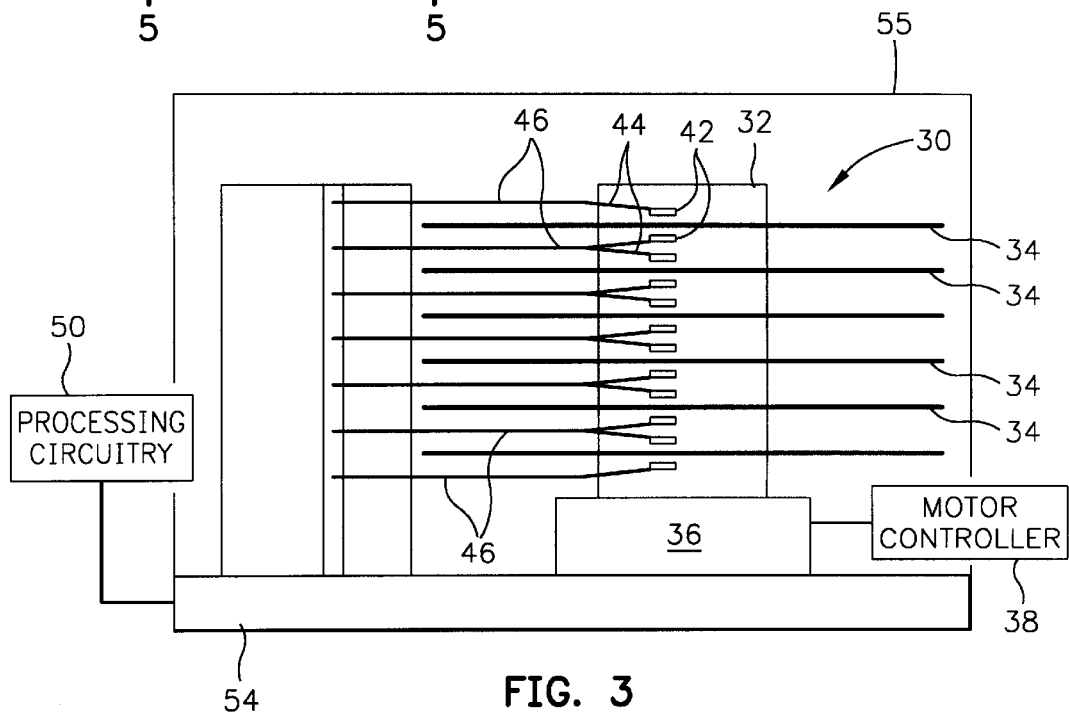
FIG. 3 is an elevation view of the magnetic disk drive wherein multiple disks and magnetic heads are employed.
Figure 4:
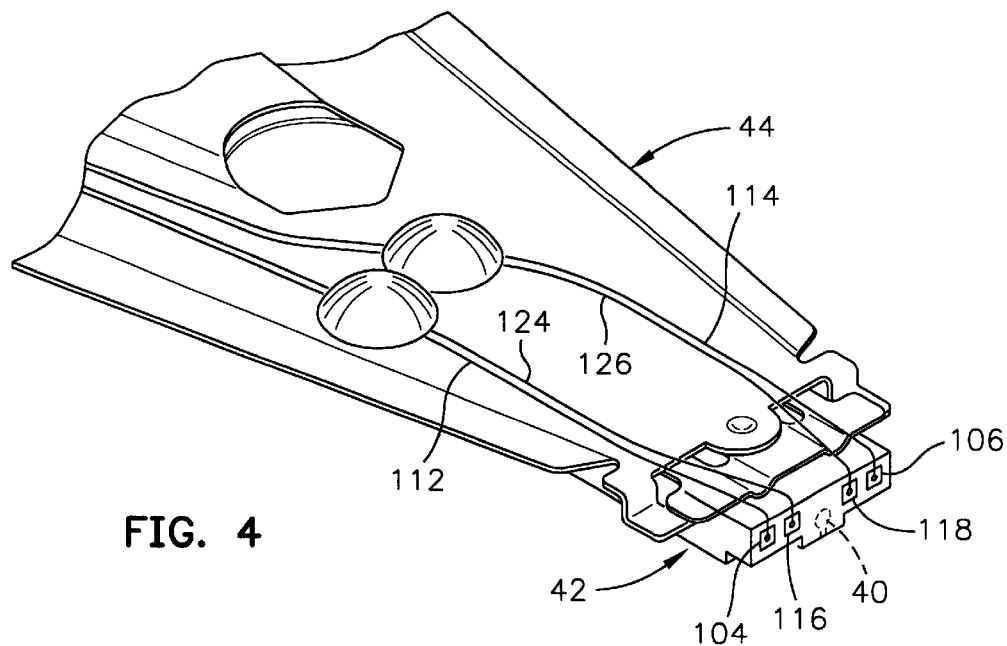
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 supports a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
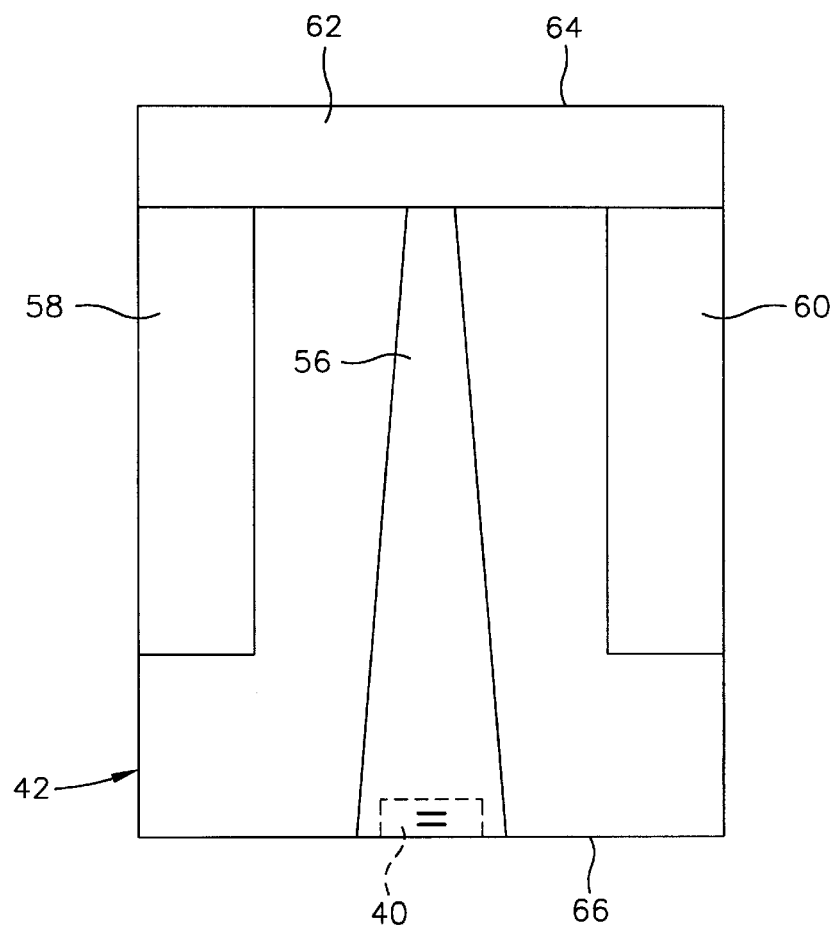
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
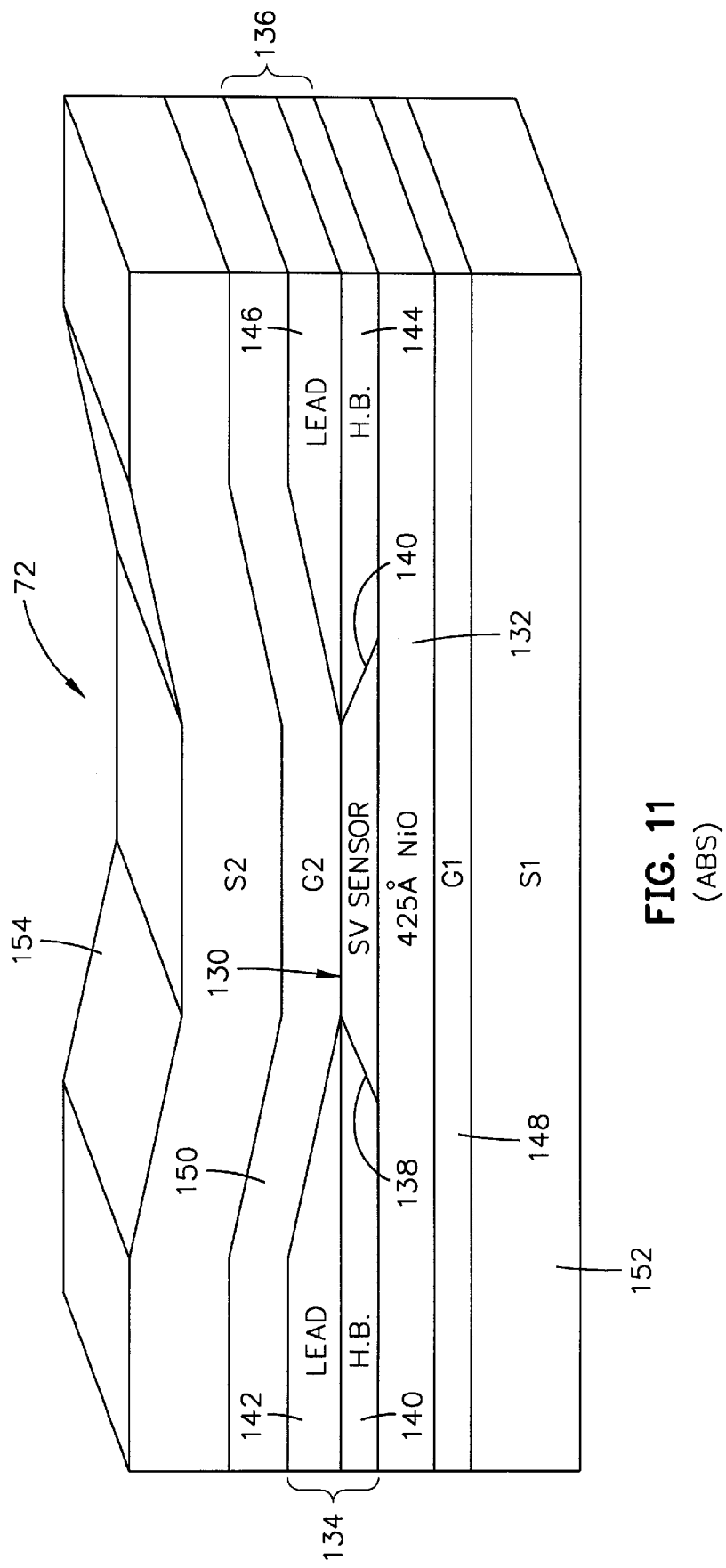
FIG. 11 is an isometric ABS illustration of a read head which employs a spin valve sensor longitudinally biased by hard biasing layers.

FIG. 11 is an isometric ABS illustration of a read head 72 which has a spin valve sensor 130. The spin valve sensor 130 has a pinned layer structure, to be described hereinafter, which has a magnetic moment that is pinned by an antiferromagnetic (AFM) pinning layer 132. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037. The first hard bias and lead layers include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

The Invention

Figure 12:
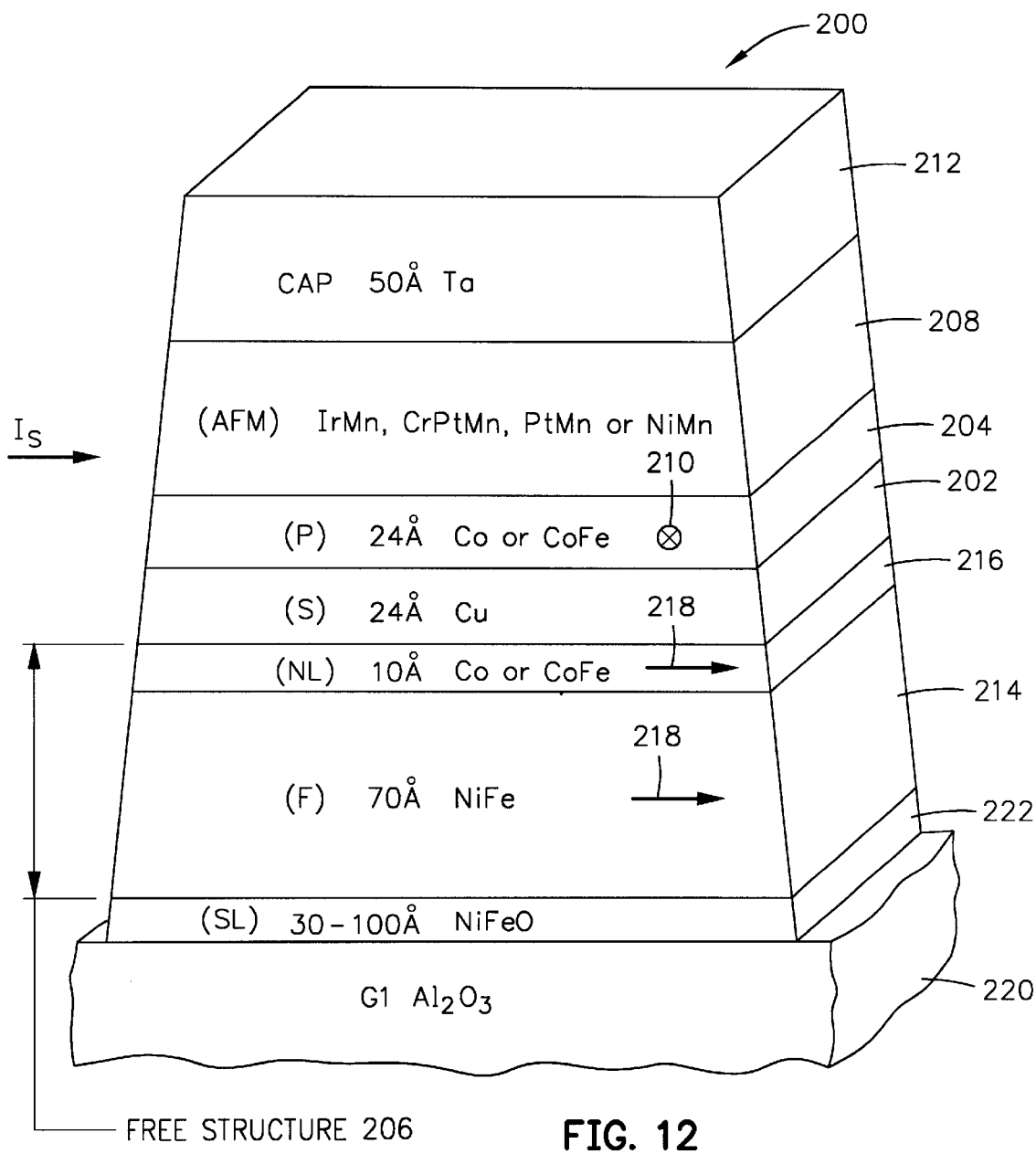
FIG. 12 is an isometric ABS illustration of a first embodiment of the present invention.

FIG. 12, which shows a first embodiment of the present spin valve sensor 200, includes a nonmagnetic conductive spacer layer (S) 202 which is located between a pinned layer (P) 204 and a free layer structure 206. An antiferromagnetic pinning layer (AFM) 208 is exchange coupled to the pinned layer 204 for pinning a magnetic moment 210 of the pinned layer perpendicular to the ABS, in a direction toward the ABS or away from the ABS as shown in FIG. 12. A cap layer 212 may be located on the pinning layer 208 for protecting it from subsequent processing steps in the construction of the read head.

The free structure 206 may include a free layer (F) 214 and a nanolayer (NL) 216 that have magnetic moments 218 that are oriented parallel to the ABS, either from right to left, or from left to right as shown in FIG. 12. A relative rotation between the magnetic moments 210 and 218 determines the resistance of the sensor to a sense current $I_s$ conducted through the sensor by the aforementioned processing circuitry 50. When a signal field rotates the magnetic moment 218 upwardly the resistance decreases and when a signal field rotates the magnetic moment 218 downwardly the resistance decreases. These resistance changes cause potential changes in the processing circuitry 50 which are processed as playback signals. It should be understood that the orientations of the magnetic moment 210, the magnetic moment 218 and the sense current $I_s$ may be reversed if desired.

A seed layer (SL) 222 is located between the first read gap layer (G1) 220 and the free structure 206. The seed layer 222, in this embodiment, is nickel iron oxide (NiFeO). Without the seed layer the free layer structure 206 interfaces the first read gap layer 220 which is typically aluminum oxide (Al$_2$O$_3$). It has been found that aluminum oxide (Al$_2$O$_3$) does not promote the best microstructure of the free layer 214 which is typically nickel iron (NiFe). The nickel iron oxide (NiFeO) seed layer 222 prevents an interface between the aluminum oxide (Al$_2$O$_3$) first read gap layer 220 and the nickel iron (NiFe) free layer 214 and has a crystalline structure which modifies a crystalline structure of the free layer 214 for increasing the magnetoresistive coefficient dr/R of the sensor. This may be because the nickel iron oxide (NiFeO) is nickel iron (NiFe) based. Without the nickel iron (NiFe) base the aluminum oxide (Al$_2$O$_3$) of the first read gap layer 220 has been found wanting for promoting the crystalline structure of the nickel iron (NiFe) free layer 214. It should be noted that an improved microstructure of the free layer 214 will, in turn, promote an improved microstructure of the cobalt (Co) or cobalt iron (CoFe) nanolayer 216, the nanolayer 216 will promote an improved microstructure of the copper (Cu) spacer layer 202 and the spacer layer 202 will promote an improved microstructure of the cobalt (Co) or cobalt iron (CoFe) pinned layer 204. Accordingly, the seed layer 222 starts a chain reaction of improvements in the microstructures of the subsequent layers deposited thereon.

Figure 13:
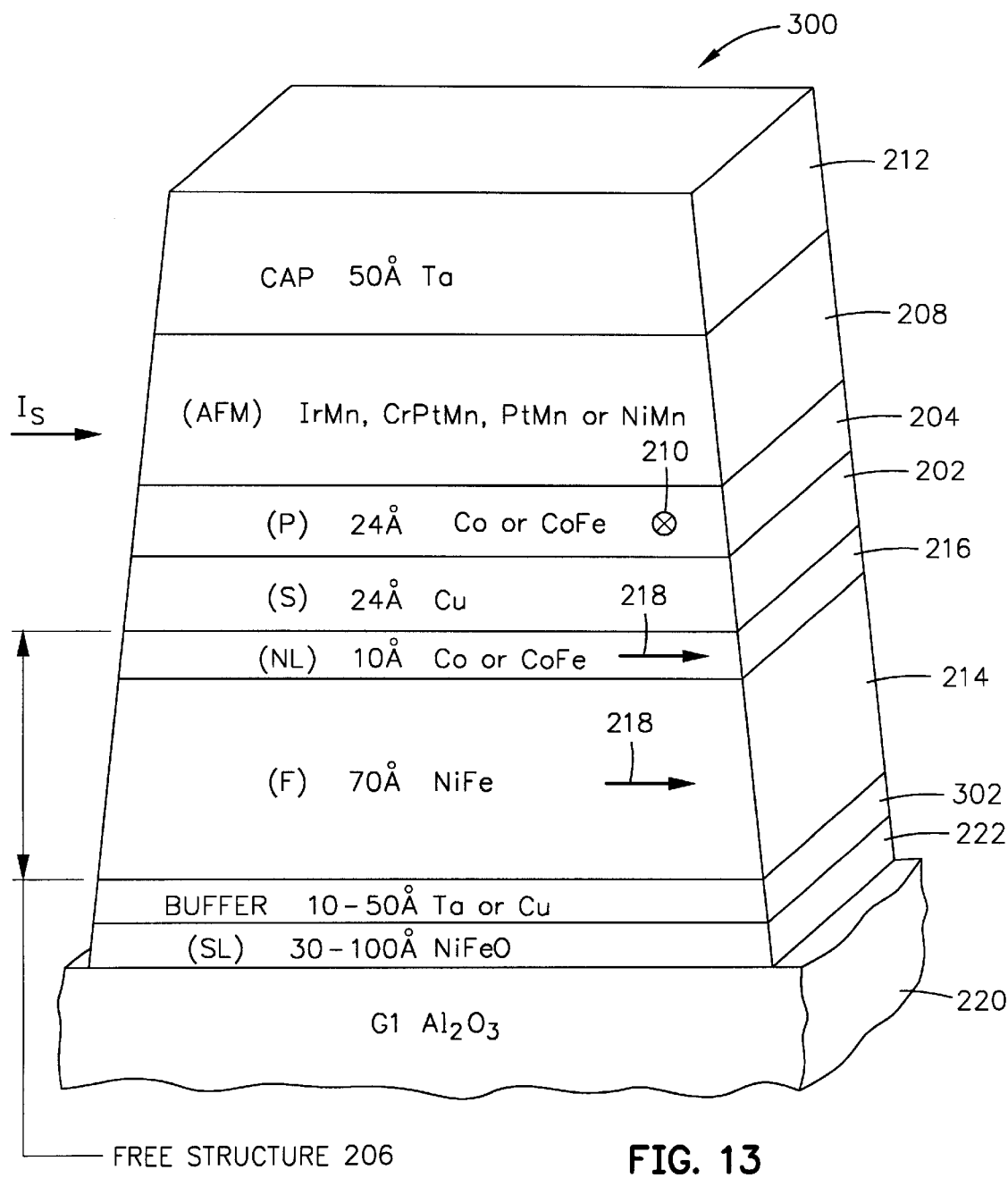
FIG. 13 is an isometric ABS illustration of a second embodiment of the present invention.

FIG. 13, which is a second embodiment of the present spin valve sensor 300, is the same as the spin valve sensor 200 in FIG. 12 except for a buffer layer 302 which is located between the seed layer 222 and the free layer 214. The buffer layer 302 is a nonmagnetic metal such as tantalum (Ta) or copper (Cu). Since the seed layer 222 is an oxide it has been found beneficial for promoting the microstructure of the free layer 214 to have a nonmagnetic metallic layer therebetween as a buffer. The buffer layer 302 will further promote the magnetoresistive coefficient dr/R of the spin valve sensor.

Figure 14:
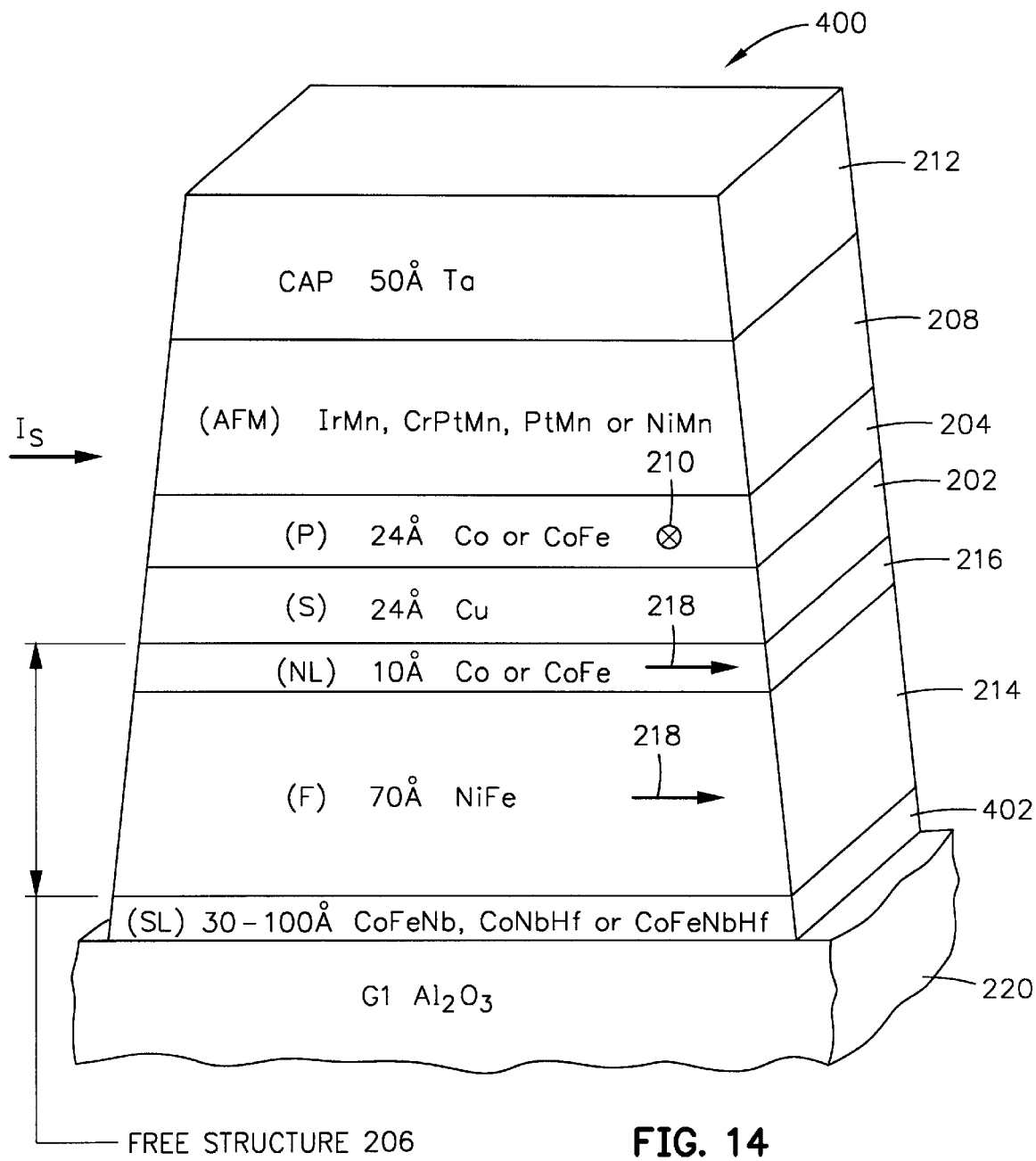
FIG. 14 is an isometric ABS illustration of a third embodiment of the present invention.

FIG. 14, which is a third embodiment of the present spin valve sensor 400, is the same as the spin valve sensor 200 in FIG. 12 except a cobalt niobium (CoNb) based seed layer 402 is located between the first read gap layer 220 and the free layer 214. The cobalt niobium (CoNb) material may be cobalt iron niobium (CoFeNb), cobalt niobium hafnium (CoNbHf) or cobalt iron niobium hafnium (CoFeNbHf). The cobalt niobium (CoNb) based material is amorphous which requires that the niobium (Nb) content be substantially 5% or greater. The iron (Fe) content is preferably 1% to 2%. The hafnium (Hf) content is preferably 1% to 3%. The seed layer 402 in FIG. 14 differs from the seed layer 222 in FIG. 12 and 13 in that the seed layer 402 is amorphous instead of crystalline. The cobalt niobium (CoNb) based seed layer 402 improves the microstructure of the free layer 214 and subsequently formed layers.

Figure 15:
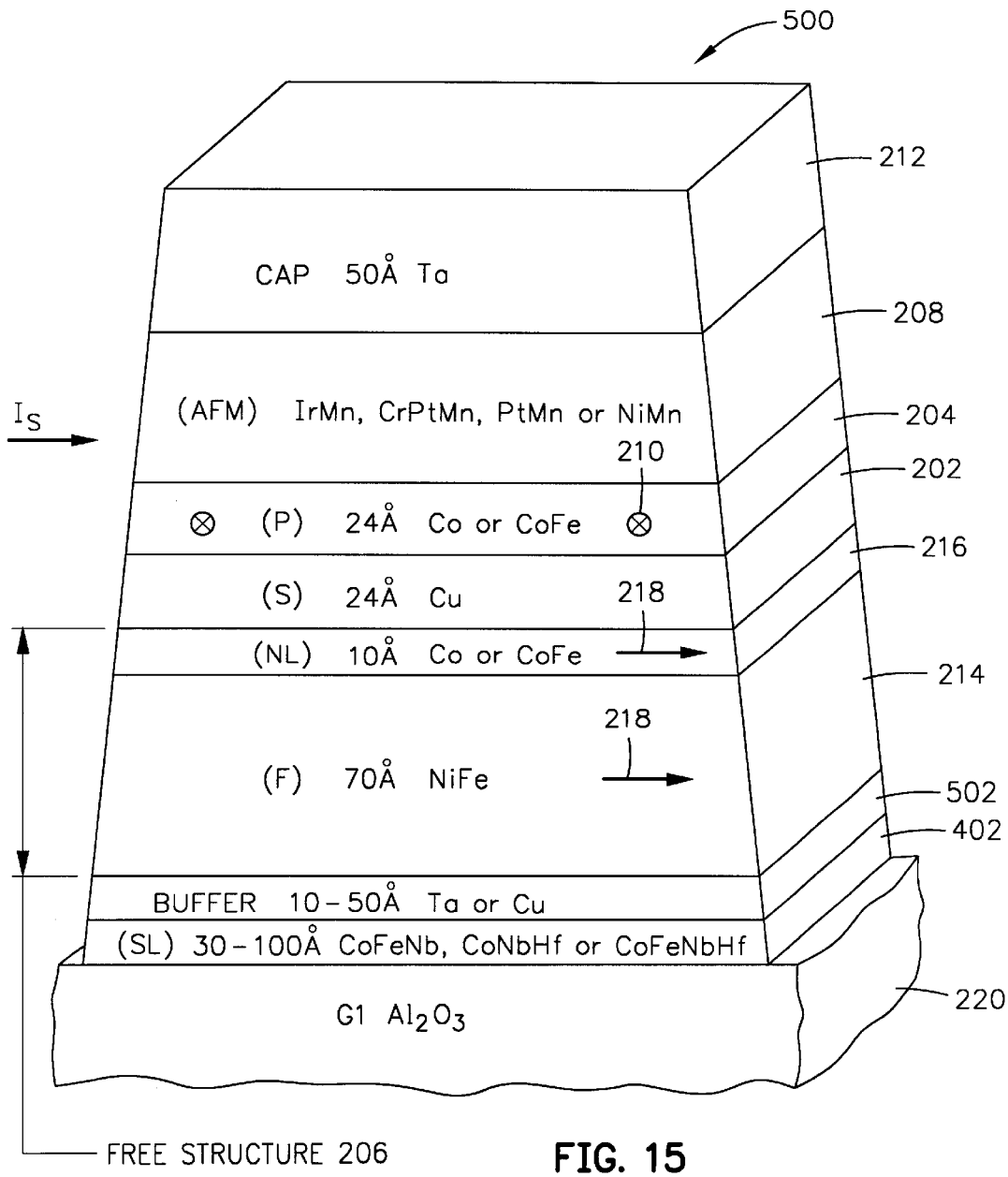
FIG. 15 is an isometric ABS illustration of a fourth embodiment of the present invention.

FIG. 15, which is a fourth embodiment of the present spin valve sensor 500, is the same as the spin valve sensor 400 in FIG. 14 except a buffer layer 502 is located between the seed layer 402 and the free layer 214. The buffer layer 502 is a nonmagnetic metal such as tantalum (Ta) or copper (Cu). The buffer layer 502 further enhances the microstructure of the free layer 214 and subsequent layers formed thereon.

Figure 16:
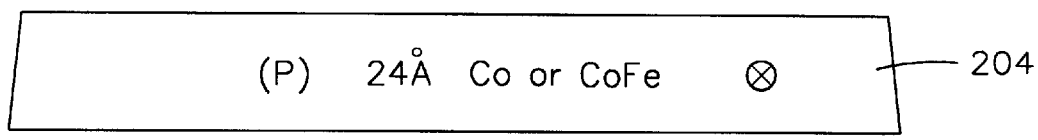
FIG. 16 is an ABS illustration of a single pinned layer.
Figure 17:
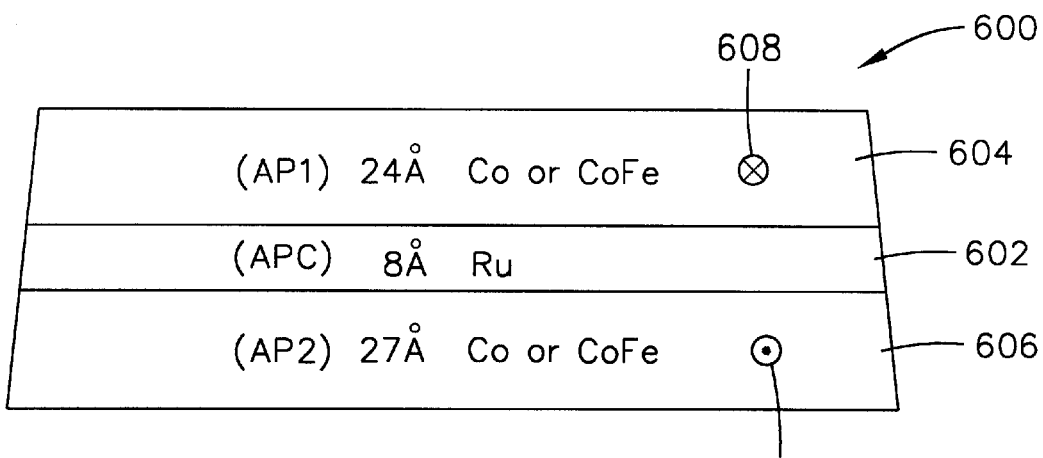
FIG. 17 is an ABS illustration of an antiparallel (AP) pinned layer structure.

FIG. 16 is an enlarged ABS illustration of the single pinned layer 204 in FIGS. 12–15 and FIG. 17 shows an antiparallel (AP) pinned structure 600. The pinned structure 600 includes an AP coupling (APC) layer 602 which is located between first and second AP pinned layers (AP1) and (AP2) 604 and 606. The pinning layer 208 in FIGS. 12–15 may pin the magnetic moment 608 of the first AP pinned layer 604 perpendicular to and away from the ABS which, in turn, pins the magnetic moment 610 of the second AP pinned layer 606 antiparallel to the magnetic moment 608 by an antiparallel coupling between the first and second AP pinned layer 604 and 606. The AP coupling layer 602 may be 8 Å of ruthenium (Ru) and each of the first and second AP pinned layers 604 and 606 may be 24 Å and 27 Å respectively of cobalt (Co) or cobalt iron (CoFe). Optionally, the first and second AP pinned layers 604 and 606 may be 27 Å and 24 Å respectively of cobalt (Co) or cobalt iron (CoFe).

The preferred thickness of the seed layer in each of the embodiments shown in FIGS. 12–15 is 30 Å to 100 Å and the preferred thickness of the buffer layer in each of the embodiments in FIGS. 13 and 15 is 10 Å to 50 Å. Exemplary thicknesses of the other layers are 70 Å of nickel iron (NiFe) for the free layer 214, 10 Å of cobalt (Co) or cobalt iron (CoFe) for the nanolayer 216, and 24 Å of copper (Cu) for the spacer layer 202, 24 Å of cobalt (Co) or cobalt iron (CoFe) for the pinned layer 204. The antiferromagnetic material employed for the pinning layer 208 may be iridium manganese (IrMn), chromium platinum manganese (CrPtMn), platinum manganese (PtMn) or nickel manganese (NiMn) with exemplary respective thicknesses of 80 Å, 200 Å, and 250 Å respectively. A typical thickness and material for the cap layer 212 is 50 Å of tantalum (Ta).

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head comprising:
ferromagnetic first and second shield layers;
nonmagnetic nonconductive first and second read gap layers located between the first and second shield layers;
a spin valve sensor located between the first and second read gap layers;
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment;
a nonmagnetic conductive spacer layer located between the pinned layer structure and the free layer;
a seed layer located between the free layer and the first read gap layer; and
the seed layer being composed of an amorphous cobalt niobium (CoNb) based material or a crystalline nickel iron oxide (NiFeO) material wherein the cobalt niobium (CoNb) based material is selected from the group comprising cobalt iron niobium (CoFeNb), cobalt niobium hafnium (CoNbHf) and cobalt iron niobium hafnium (CoFeNbHf).

2. A magnetic read head as claimed in claim 1 including:
a nonmagnetic metallic buffer layer between the seed layer and the free layer.

3. A magnetic read head as claimed in claim 2 wherein the buffer layer is tantalum (Ta) or copper (Cu).

4. A magnetic read head as claimed in claim 1 wherein the pinning layer is selected from the group comprising iridium manganese (IrMn), chromium platinum manganese (CrPtMn), platinum manganese (PtMn) and nickel manganese (NiMn).

5. A magnetic read head as claimed in claim 4 wherein the pinned layer structure includes:
ferromagnetic first and second antiparallel (AP) pinned layers; and
an antiparallel (AP) coupling layer located between the first and second AP pinned layers.

6. A magnetic read head comprising:
ferromagnetic first and second shield layers;
nonmagnetic nonconductive first and second read gap layers located between the first and second shield layers;
a spin valve sensor located between the first and second read gap layers;
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment;
a nonmagnetic conductive spacer layer located between the pinned layer structure and the free layer;
a seed layer located between the free layer and the first read gap layer; and
the seed layer being composed of nickel iron oxide (NiFeO).

7. A magnetic read head as claimed in claim 6 including:
a nonmagnetic metallic buffer layer between the seed layer and the free layer.

8. A magnetic read head as claimed in claim 7 wherein the buffer layer is tantalum (Ta) or copper (Cu).

9. A magnetic read head as claimed in claim 8 wherein the pinning layer is selected from the group comprising iridium manganese (IrMn), chromium platinum manganese (CrPtMn), platinum manganese (PtMn) and nickel manganese (NiMn).

10. A magnetic read head as claimed in claim 9 wherein the pinned layer structure includes:
ferromagnetic first and second antiparallel (AP) pinned layers; and
an antiparallel (AP) coupling layer located between the first and second AP pinned layers.

11. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions;
the read head including:
a spin valve sensor that has first and second side edges;
nonmagnetic nonconductive first and second read gap layers;
first and second hard bias and lead layers connected to the first and second side edges of the spin valve sensor;
a ferromagnetic first shield layer; and
the first and second read gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment;
a nonmagnetic conductive spacer layer located between the pinned layer structure and the free layer; and
a seed layer located between the free layer and the first read gap layer; and
the seed layer being composed of an amorphous cobalt niobium (CoNb) based material or a crystalline nickel iron oxide (NiFeO) material wherein the cobalt niobium (CoNb) based material is selected from the group comprising cobalt iron niobium (CoFeNb), cobalt niobium hafnium (CoNbHf) and cobalt iron niobium hafnium (CoFeNbHf).

12. A magnetic head assembly as claimed in claim 11 including:
the read head further including:
a ferromagnetic second shield layer;
a nonmagnetic separation layer; and
the separation layer being located between the second shield layer the first pole piece layer.

13. A magnetic head assembly as claimed in claim 11 including:
a nonmagnetic metallic buffer layer between the seed layer and the free layer.

14. A magnetic head assembly as claimed in claim 13 wherein the buffer layer is tantalum (Ta) or copper (Cu).

15. A magnetic head assembly having a read head and a write head comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor that has first and second side edges;
nonmagnetic nonconductive first and second read gap layers;
first and second hard bias and lead layers connected to the first and second side edges of the spin valve sensor;
a ferromagnetic first shield layer; and
the first and second read gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment;
a nonmagnetic conductive spacer layer located between the pinned layer structure and the free layer; and
a seed layer located between the free layer and the first read gap layer; and
the seed layer being composed of nickel iron oxide (NiFeO).

16. A magnetic head assembly as claimed in claim 15 including:
a nonmagnetic metallic buffer layer between the seed layer and the free layer.

17. A magnetic head assembly as claimed in claim 16 wherein the buffer layer is tantalum (Ta) or copper (Cu).

18. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a spin valve sensor that has first and second side edges;
first and second hard bias and lead layers connected to the first and second side edges of the spin valve sensor;
nonmagnetic nonconductive first and second read gap layers;
the spin valve sensor and the first and second hard bias and lead layers being located between the first and second read gap layers;
a ferromagnetic first shield layer; and
the first and second read gap layers being located between the first shield layer and the first pole piece layer; and
the spin valve sensor including:
a ferromagnetic pinned layer structure that has a magnetic moment;
an antiferromagnetic pinning layer exchange coupled to the pinned layer structure for pinning the magnetic moment of the pinned layer structure;
a ferromagnetic free layer having a magnetic moment; and
a nonmagnetic conductive spacer layer located between the pinned layer structure and the free layer;
a seed layer located between the free layer and the first read gap layer; and
the seed layer being composed of an amorphous cobalt niobium (CoNb) based material or a crystalline nickel iron oxide (NiFeO) material wherein the cobalt niobium (CoNb) based material is selected from the group comprising cobalt iron niobium (CoFeNb), cobalt niobium hafnium (CoNbHf) and cobalt iron niobium hafnium (CoFeNbHf); and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

19. A magnetic disk drive as claimed in claim 18 including:
the read head further including:
a ferromagnetic second shield layer;
a nonmagnetic separation layer; and
the separation layer being located between the second shield layer the first pole piece layer.

20. A magnetic disk drive as claimed in claim 18 including:
a nonmagnetic metallic buffer layer between the seed layer and the free layer.

21. A magnetic disk drive as claimed in claim 20 wherein the buffer layer is tantalum (Ta) or copper (Cu).

22. A magnetic disk drive having at least one slider that has an air bearing surface (ABS), the slider supporting at least one magnetic head assembly that includes a read head and a write head, the disk drive comprising:
the write head including:
ferromagnetic first and second pole piece layers;
each of the first and second pole piece layers having a yoke portion located between a pole tip portion and a back gap portion;

a nonmagnetic write gap layer located between the pole tip portions of the first and second pole piece layers;

an insulation stack with at least one coil layer embedded therein located between the yoke portions of the first and second pole piece layers; and the first and second pole piece layers being connected at their back gap portions; and the read head including:

a spin valve sensor that has first and second side edges;

first and second hard bias and lead layers connected to the first and second side edges of the spin valve sensor;

nonmagnetic nonconductive first and second read gap layers;

the spin valve sensor and the first and second hard bias and lead layers being located between the first and second read gap layers;

a ferromagnetic first shield layer; and the first and second read gap layers being located between the first shield layer and the first pole piece layer; and the spin valve sensor including:

a ferromagnetic pinned layer structure that has a magnetic moment;

an antiferromagnetic pinning layer exchange coupled to the pinned layer structure for pinning the magnetic moment of the pinned layer structure;

a ferromagnetic free layer having a magnetic moment;

a nonmagnetic conductive spacer layer located between the pinned layer structure and the free layer;

a seed layer located between the free layer and the first read gap layer; and the seed layer being composed of nickel iron oxide (NiFeO);

a housing;

a magnetic disk rotatably supported in the housing;

a support mounted in the housing for supporting the magnetic head assembly with its ABS facing the magnetic disk so that the magnetic head assembly is in a transducing relationship with the magnetic disk;

a spindle motor for rotating the magnetic disk;

an actuator connected to the support for moving the magnetic head assembly to multiple positions with respect to said magnetic disk; and a processor connected to the magnetic head assembly, to the spindle motor and to the actuator for exchanging signals with the magnetic head assembly, for controlling rotation of the magnetic disk and for controlling the position of the magnetic head assembly relative to the magnetic disk.

23. A magnetic disk drive as claimed in claim 22 including:

a nonmagnetic metallic buffer layer between the seed layer and the free layer.

24. A magnetic disk drive as claimed in claim 23 wherein the buffer layer is tantalum (Ta) or copper (Cu).

25. A method of making a read head that includes a spin valve sensor comprising the steps of:

a making the spin valve sensor comprising the steps of:

forming a ferromagnetic pinned layer structure that has a magnetic moment;

forming an antiferromagnetic pinning layer exchange coupled to the pinned layer structure for pinning the magnetic moment of the pinned layer structure;

forming a ferromagnetic free layer having a magnetic moment;

forming a nonmagnetic conductive spacer layer between the pinned layer structure and the free layer; and forming a seed layer located between the free layer and the first read gap layer wherein the seed layer is composed of an amorphous cobalt niobium (CoNb) based material or a crystalline nickel iron oxide (NiFeO) material wherein the cobalt niobium (CoNb) based material is formed from the group comprising cobalt iron niobium (CoFeNb), cobalt niobium hafnium (CoNbHf) and cobalt iron niobium hafnium (CoFeNbHf).

26. A method as claimed in claim 25 further including the steps of:

forming a nonmagnetic metallic buffer layer between the seed layer and the free layer.

27. A method as claimed in claim 26 wherein the buffer layer is formed of tantalum (Ta) or copper (Cu).

28. A method as claimed in claim 27 wherein the pinning layer is formed from the group comprising iridium manganese (IrMn), chromium platinum manganese (CrPtMn), platinum manganese (PtMn) and nickel manganese (NiMn).

29. A method as claimed in claim 28 wherein the pinned layer structure is further formed comprising the steps of:

forming ferromagnetic first and second antiparallel (AP) pinned layers; and forming an antiparallel (AP) coupling layer between the first and second AP pinned layers.

30. A method of making a read head that includes a spin valve sensor comprising the steps of:

a making the spin valve sensor comprising the steps of:

forming a ferromagnetic pinned layer structure that has a magnetic moment;

forming an antiferromagnetic pinning layer exchange coupled to the pinned layer structure for pinning the magnetic moment of the pinned layer structure;

forming a ferromagnetic free layer having a magnetic moment;

forming a nonmagnetic conductive spacer layer between the pinned layer structure and the free layer; and forming a seed layer located between the free layer and the first read gap layer wherein the seed layer is composed of nickel iron oxide (NiFeO).

31. A method as claimed in claim 30 further including the steps of:

forming a nonmagnetic metallic buffer layer between the seed layer and the free layer.

32. A method as claimed in claim 31 wherein the buffer layer is formed of tantalum (Ta) or copper (Cu).

33. A method as claimed in claim 32 wherein the pinning layer is formed from the group comprising iridium manganese (IrMn), chromium platinum manganese (CrPtMn), platinum manganese (PtMn) and nickel manganese (NiMn).

34. A method as claimed in claim 33 wherein the pinned layer structure is further formed comprising the steps of:

forming ferromagnetic first and second antiparallel (AP) pinned layers; and forming an antiparallel (AP) coupling layer between the first and second AP pinned layers.

35. A method of making a magnetic head assembly having a read head and a write head comprising the steps of:

a forming of the write head comprising the steps of:

forming ferromagnetic first and second pole piece layers with a yoke portion between a pole tip portion and a back gap portion;

forming a nonmagnetic write gap layer between the pole tip portions of the first and second pole piece layers;

forming an insulation stack with at least one coil layer embedded therein in the yoke portions of the first and second pole piece layers; and connecting the first and second pole piece layers at their back gaps portions; and a forming of the read head comprising the steps of:

forming a spin valve sensor that has first and second side edges;

forming first and second hard bias and lead layers connected to the first and second side edges of the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and forming the spin valve sensor as follows:

forming a ferromagnetic pinned layer structure that has a magnetic moment;

forming an antiferromagnetic pinning layer exchange coupled to the pinned layer structure for pinning the magnetic moment of the pinned layer structure;

forming a ferromagnetic free layer having a magnetic moment; and forming a nonmagnetic conductive spacer layer between the pinned layer structure and the free layer; and forming a seed layer located between the free layer and the first read gap layer wherein the seed layer is composed of an amorphous cobalt niobium (CoNb) based material or a crystalline nickel iron oxide (NiFeO) material wherein the cobalt niobium (CoNb) based material is formed from the group comprising cobalt iron niobium (CoFeNb), cobalt niobium hafnium (CoNbHf) and cobalt iron niobium hafnium (CoFeNbHf).

36. A method as claimed in claim 35 further comprising the steps of:

forming a ferromagnetic second shield layer; and forming a nonmagnetic separation layer between the second shield layer the first pole piece layer.

37. A method as claimed in claim 35 further including the steps of:

forming a nonmagnetic metallic buffer layer between the seed layer and the free layer.

38. A method as claimed in claim 37 wherein the buffer layer is formed of tantalum (Ta) or copper (Cu).

39. A method of making a magnetic head assembly having a read head and a write head comprising the steps of:

a forming of the write head comprising the steps of:

forming ferromagnetic first and second pole piece layers with a yoke portion between a pole tip portion and a back gap portion;

forming a nonmagnetic write gap layer between the pole tip portions of the first and second pole piece layers;

forming an insulation stack with at least one coil layer embedded therein in the yoke portions of the first and second pole piece layers; and connecting the first and second pole piece layers at their back gaps portions; and a forming of the read head comprising the steps of:

forming a spin valve sensor that has first and second side edges;

forming first and second hard bias and lead layers connected to the first and second side edges of the spin valve sensor;

forming nonmagnetic nonconductive first and second read gap layers;

forming the spin valve sensor and the first and second hard bias and lead layers between the first and second read gap layers;

forming a ferromagnetic first shield layer; and forming the first and second read gap layers between the first shield layer and the first pole piece layer; and forming the spin valve sensor as follows:

forming a ferromagnetic pinned layer structure that has a magnetic moment;

forming an antiferromagnetic pinning layer exchange coupled to the pinned layer structure for pinning the magnetic moment of the pinned layer structure;

forming a ferromagnetic free layer having a magnetic moment; and forming a nonmagnetic conductive spacer layer between the pinned layer structure and the free layer; and forming a seed layer located between the free layer and the first read gap layer wherein the seed layer is composed of nickel iron oxide (NiFeO).

40. A method as claimed in claim 39 further including the steps of:

forming a nonmagnetic metallic buffer layer between the seed layer and the free layer.

41. A method as claimed in claim 40 wherein the buffer layer is formed of tantalum (Ta) or copper (Cu).

* * * * *